United States Patent [19]
Hayes et al.

[11] Patent Number: 5,987,570
[45] Date of Patent: Nov. 16, 1999

[54] PERFORMING OVERLAPPING BURST MEMORY ACCESSES AND INTERLEAVED MEMORY ACCESSES ON CACHE MISSES

[75] Inventors: Norman M. Hayes, Sunnyvale; Kumar Venkatasubramaniam, San Jose, both of Calif.

[73] Assignee: Sun Microsystems, Inc., Mountain View, Calif.

[21] Appl. No.: 08/881,557

[22] Filed: Jun. 24, 1997

Related U.S. Application Data

[63] Continuation of application No. 08/252,053, Jun. 1, 1994, abandoned, which is a continuation of application No. 07/870,566, Apr. 17, 1992, abandoned.

[51] Int. Cl.[6] ............................. G06F 12/08; G06F 13/28; G06F 13/16
[52] U.S. Cl. ......................... 711/140; 711/168; 711/169; 710/35
[58] Field of Search ..................................... 395/467, 496, 395/855, 495, 840, 841; 711/140, 168, 169

[56] References Cited

U.S. PATENT DOCUMENTS

| | | | |
|---|---|---|---|
| 4,169,284 | 9/1979 | Hogan et al. | 711/140 |
| 4,794,521 | 12/1988 | Ziegler et al. | 711/130 |
| 5,126,975 | 6/1992 | Handy et al. | 365/230.01 |
| 5,179,679 | 1/1993 | Shoemaker | 711/118 |
| 5,185,871 | 2/1993 | Frey et al. | 395/381 |
| 5,222,223 | 6/1993 | Webb, Jr. et al. | 711/140 |
| 5,293,603 | 3/1994 | MacWilliams et al. | 710/129 |
| 5,325,499 | 6/1994 | Kummer et al. | 711/143 |
| 5,416,739 | 5/1995 | Wong | 711/140 |

*Primary Examiner*—Reginald G. Bragdon
*Attorney, Agent, or Firm*—Blakely Sokoloff Taylor & Zafman

[57] ABSTRACT

A high performance microprocessor bus protocol for improving system throughput. The bus protocol enables overlapping read burst and write burst bus transactions to a cache, and interleaved bus transactions during external fetch cycles for missed cache lines. The bus protocol is implemented in a system comprising a CPU, and a secondary cache. The secondary cache comprises an SRAM array cache, and a cache controller. The CPU contains an instruction pipeline and a primary cache system.

17 Claims, 9 Drawing Sheets

5,987,570

PERFORMING OVERLAPPING BURST MEMORY ACCESSES AND INTERLEAVED MEMORY ACCESSES ON CACHE MISSES

This is a Continuation Application of application Ser. No. 08/252,053, filed Jun. 1, 1994,, now abandoned which is a continuation of application Ser. No. 07/870,566 filed Apr. 17, 1992 now abandoned.

BACKGROUND OF THE INVENTION

1. Field of the Invention

The present invention relates to computer system architecture. More particularly, the present invention relates to microprocessor bus protocols for cache memories to improve computer system throughput.

2. Art Background

A common technique for improving computer system throughput is to employ a cache memory. A cache memory is a limited size fast memory, usually made up of static RAMs (SRAMs) which store blocks of data, known as lines, that reflect selected external memory locations. A cache memory is smaller than the external memory it reflects, which means that the cache memory is typically not fully addressable, and must store a tag field for each data line. A tag field identifies the external memory address corresponding to a particular data line.

When the processor issues a read request and an address corresponding to a desired data line, the cache memory is checked by comparing the address to tag fields maintained by a cache controller. If the desired data line is stored in the cache, a hit occurs, and the desired data line is available to the processor. If the desired data line is not stored in the cache, a miss occurs, and the desired data line must be fetched from slower external memory.

In prior cache memory systems, a read transaction typically requires three steps: the processor transmitting an address to the cache, the cache controller checking the tags, and the processor reading the data line from the cache if a hit occurs. Thereafter, the processor transmits a next address to the cache and the sequence repeated. In fact, this three step sequence repeats for each data line read from the cache.

Similarly, prior cache systems typically require a three step write transaction: the processor transmitting an address and corresponding data line to the cache, the cache controller checking the tags, and the cache controller storing the data line in the cache. The processor then transmits a next address and data line to the cache and the sequence repeats.

In prior cache memory systems, achieving higher throughput rates required decreasing the latency of bus signals. However, as higher clock frequencies are used, latency limits are reached because of the inherent physical characteristics of bus signal lines. For example, increasing frequencies cause problems with signal reflections on the bus signal lines.

As will be described, the present high performance microprocessor bus protocol improves system throughput by performing read burst and write burst bus transactions to a cache, and by interleaving bus transactions during external fetch cycles for missed cache lines. Bus performance is improved by achieving high throughput at high bus frequencies, despite physical constraints on overall bus latency.

SUMMARY

The present invention discloses a high performance microprocessor bus protocol for improving system throughput. The present bus protocol enables overlapping read burst and write burst bus transactions to a cache, and interleaved bus transactions during external fetch cycles for missed cache lines. The present invention improves microprocessor bus performance by achieving high throughput at high bus frequencies, despite physical constraints on overall bus latency. The present bus protocol is implemented in a system comprising a CPU, and a secondary cache. The secondary cache comprises an SRAM array cache, and a cache controller. The CPU contains an instruction pipeline and a primary cache system.

To perform a burst read from the secondary cache, the CPU transmits a first read address to the SRAM array cache and the cache controller. On the first bus clock cycle of the transaction, the CPU initiates a first read cycle in the SRAM array cache, while the cache controller tests the first read address against a set of tags. The tags indicate whether a first data line corresponding to the first read address is stored in the SRAM array cache. On the next clock cycle, the CPU transmits a second read address to the SRAM array cache, and initiates a second read cycle in the SRAM array cache. On the next clock cycle, the CPU transmits a third read address to the SRAM array cache, and initiates a third read cycle in the SRAM array cache, while reading the first data line from the SRAM array cache. On the next clock cycle, the CPU transmits a fourth read address to the SRAM array cache, and initiates a fourth read cycle in the SRAM array cache, while reading a second data line from the SRAM array cache corresponding to the second read address. On the next clock cycle, the CPU reads a third data line from the SRAM array cache corresponding to the third read address. On the next clock cycle, the CPU reads a fourth data line from the SRAM array cache corresponding to the fourth read address.

If the tags in the cache controller indicate that the data block is not stored in the SRAM array cache, the CPU may interleave a write transaction while the cache controller externally fetches a data block containing the missed data line. Similarly, during a write transaction, if the tags in the cache controller indicate that the data line is not stored in the SRAM array cache, the CPU may interleave a read transaction while the cache controller externally fetches a data block containing the missed data line.

DETAILED DESCRIPTION OF THE INVENTION

A high performance microprocessor bus protocol for improving cache throughput is disclosed. The following description, for purposes of explanation, specific circuit devices, circuit architectures and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
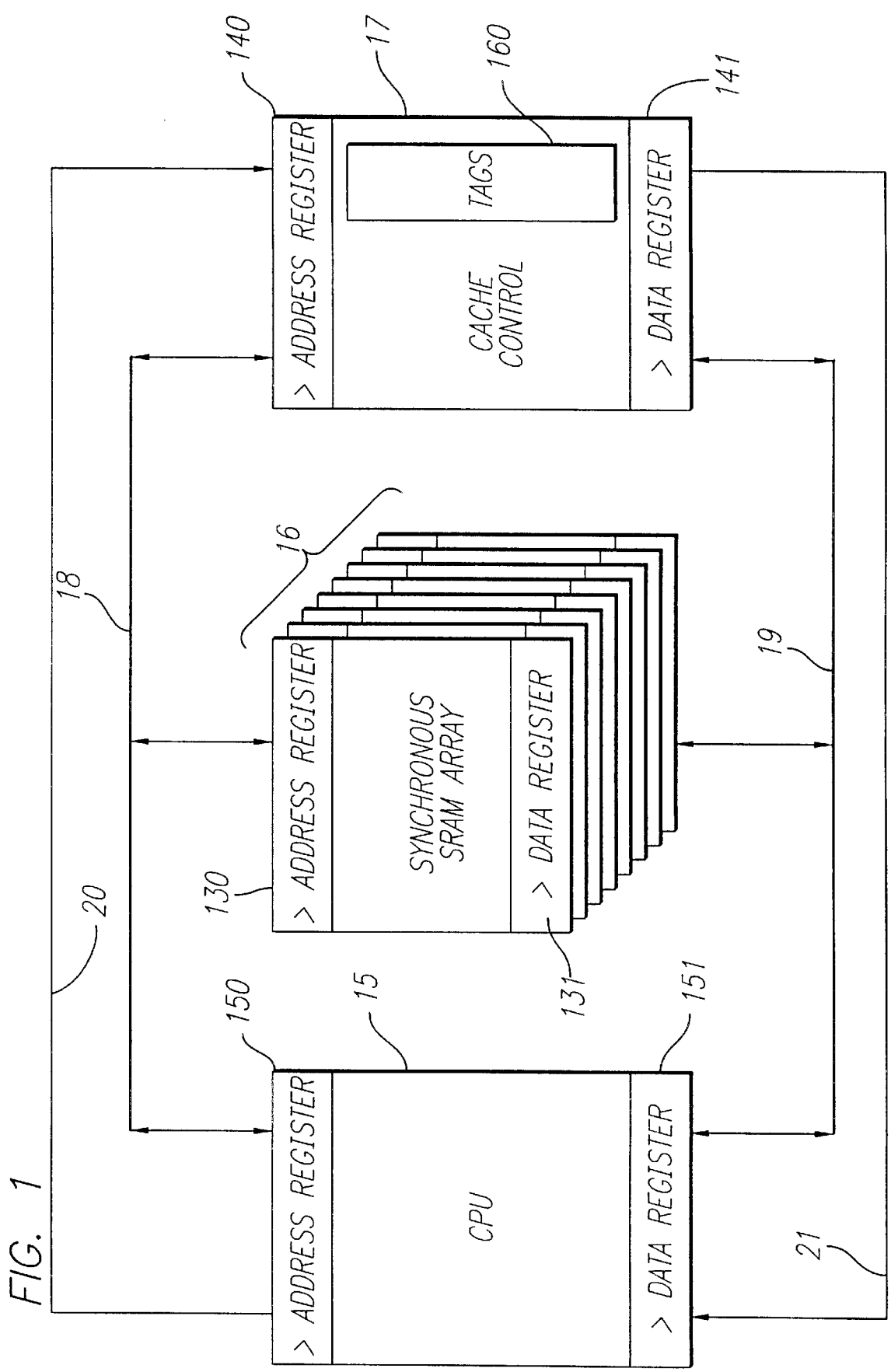
FIG. 1 illustrates an example processor and cache memory system that employ the teachings of the present invention.

FIG. 1 illustrates an example processor and cache memory subsystem that can employ the teachings of the present invention. The system is comprised of a CPU 15, an SRAM array cache 16, and a cache controller 17. The CPU 15, the SRAM array cache 16, and the cache controller 17 are each coupled to transfer addresses over an address bus 18. Also, the CPU 15, the SRAM array cache 16, and the cache controller 17 are each coupled to transfer data over data bus 19.

In the current embodiment of the present invention, the address bus 18 comprises 36 bits, and the data bus 19 comprises 64 bits. The CPU 15 transmits strobe signals to cache controller 17 over a control bus 20. The CPU 15 receives strobe signals from the cache controller 17 over a control bus 21.

In the current embodiment, the SRAM array cache 16 comprises eight 128 k by 9 bit synchronous SRAMs. The eight layers of 9 bits each yields 72 bits, of which 64 bits are data and 8 bits are parity. The SRAM array cache 16 functions as a secondary cache for the CPU 15. The cache controller 17 maintains tags 160 indicating the contents of the SRAM array cache 16.

Figure 2:
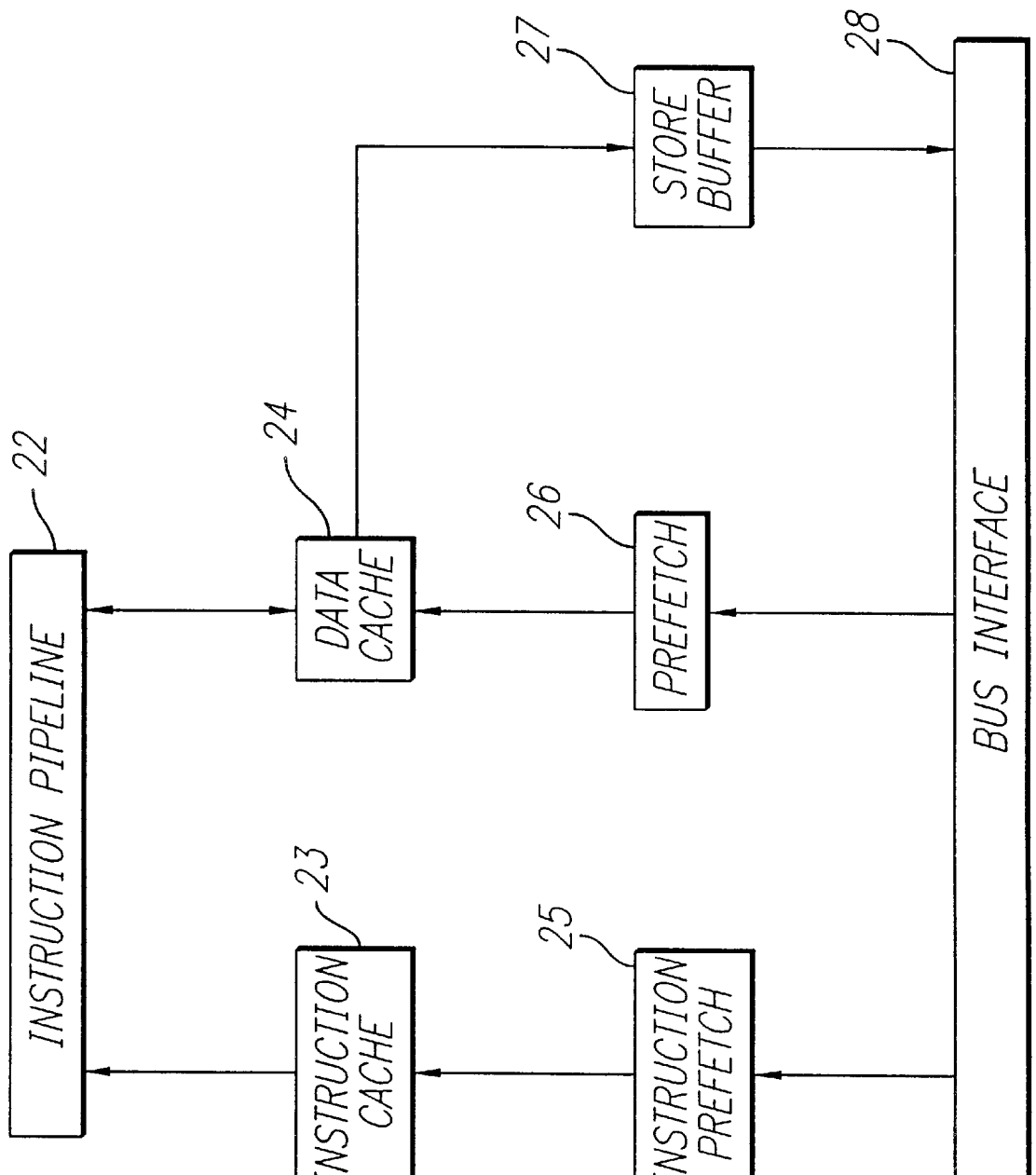
FIG. 2 illustrates an example primary cache for the CPU 15 that can employ the teachings of the present invention.

FIG. 2 illustrates an example primary cache system for the CPU 15 that can employ the teachings of the present invention. An instruction pipeline 22 represents the instruction processor for the CPU 15. The instruction pipeline 22 receives instructions from an instruction cache 23. The instruction pipeline 22 accesses data from a data cache 24.

An instruction prefetch unit 25 prefetches and supplies instructions to the instruction cache 23. A prefetch unit 26 prefetches and supplies data to the data cache 24. The instruction prefetch unit 25, and the prefetch unit 26 each communicate with the SRAM array cache 16 through a bus interface unit 28. Data to be stored in the SRAM array cache 16 is accumulated in a store buffer 27. The store buffer 27 transfers data to the SRAM array cache 16 through the bus interface unit 28.

The high performance microprocessor bus protocol, described in detail below, enables high speed transfers between the SRAM array cache 16 and the instruction prefetch unit 25, the data prefetch unit 26, and the store buffer 27.

Figure 3:
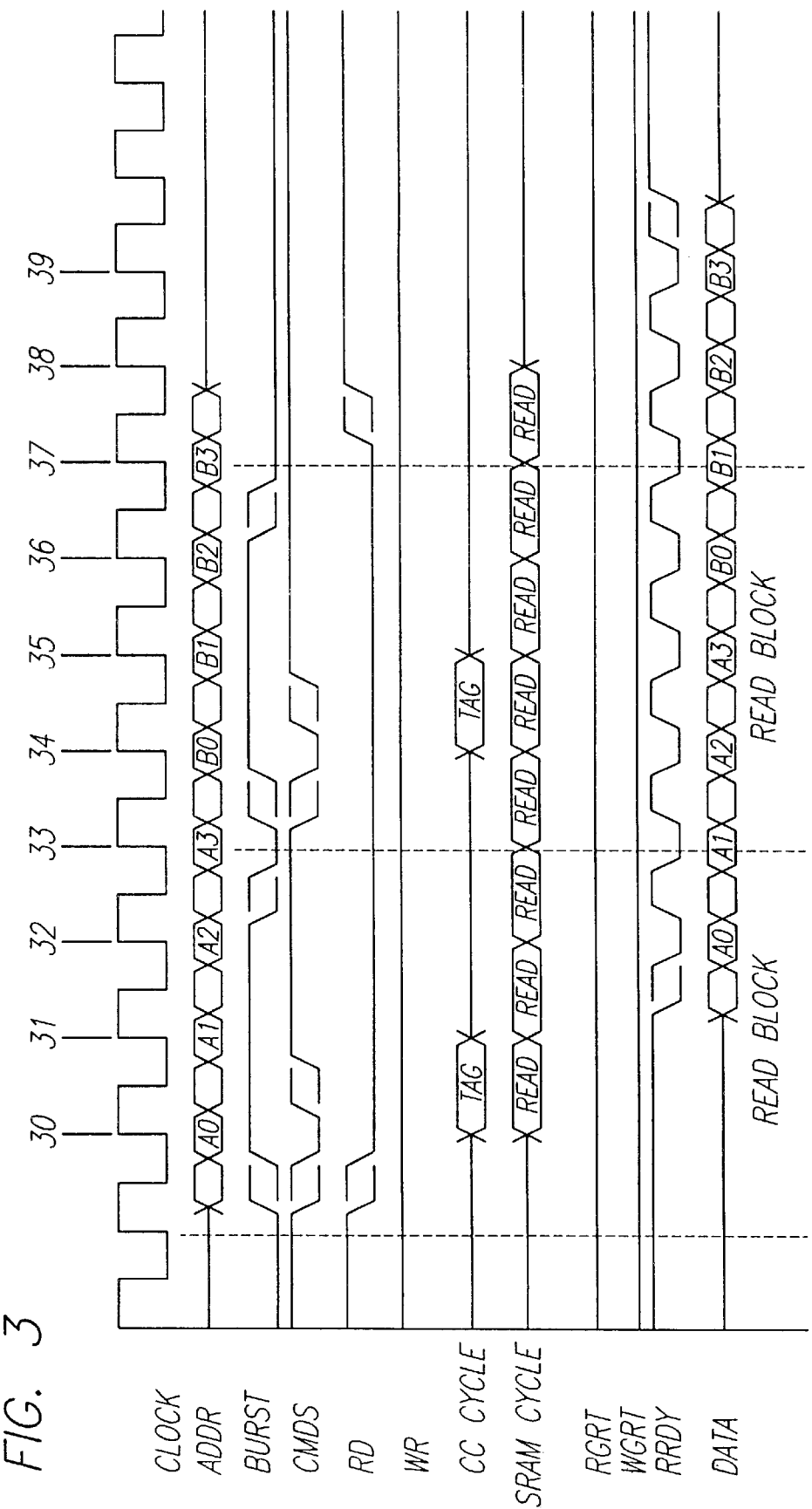
FIG. 3 illustrates overlapping read block transactions, both of which hit the SRAM array cache 16. The first read block corresponds to data lines defined by addresses A0–A3, and the second read block corresponds to data lines defined by addresses B0–B3.

FIG. 3 illustrates overlapping read block transactions, both of which hit the SRAM array cache 16. The first read block corresponds to data lines defined by addresses A0–A3, and the second read block corresponds to data lines defined by addresses B0–B3.

A clock signal (CLOCK) is used to synchronize information transfer over the address bus 18 and the data bus 19. Address signals transmitted over the address bus 18 are represented by an ADDR signal. A BURST signal is used to indicate a burst transaction. A CMDS signal is used to indicate the start of each bus transaction. An RD signal is used to indicate that a read transaction is underway, while a WR signal is used to indicate a write transaction. A CC cycle indicates the cache controller 17 activity, and an SRAM cycle indicates the SRAM array cache 16 activity. An RGRT signal indicates that a read transaction can take place, and a WGRT signal indicates that a write transaction can take place. An RRDY signal indicates that read data is available, and DATA represents the state of the data bus 19.

The first read block transaction begins at time 30, when the CMDS signal transmitted by the bus interface unit 28 is valid, indicating the start of a bus transaction. The first address A0 of the first read block is also valid at time 30, as indicated by the ADDR signal, and is loaded into the SRAM array address register 130 and the cache controller address register 14 on the rising edge of the CLOCK signal. The first address A0 is transmitted over the address bus 18 by the bus interface unit 28. The tags 160 of the cache controller 17 are checked against the address A0 stored in the cache controller address register 140 at time 30, as indicated by the CC cycle signal. Also at time 30, a read cycle of the SRAM array cache 16 begins, as indicated by the SRAM cycle signal. The RD signal indicates that the address A0 on the address bus 18 is for a read transaction, and the BURST signal indicates that the address A0 on the address bus 18 is part of a burst transaction. The RD and BURST signals are transmitted over the control bus 20 by the bus interface unit 28.

At time 31, the second address A1 transmitted by the bus interface unit 28 is valid on the address bus 18, and is loaded into the SRAM array address register 130 on the rising edge of the CLOCK signal. Between times 31 and 32, a read cycle of the SRAM array cache 16 occurs, as indicated by the SRAM cycle signal. In a similar manner, the third and fourth addresses, A2 and A3, of the first read block are are fed into the SRAM array address register 130 on the rising edge of the CLOCK signal at times 32 and 33, respectively.

At time 32, the RRDY signal indicates to the bus interface unit 28 that the incoming read data on the data bus 19 is valid. The RRDY signal is transmitted by the cache controller 17 over the control bus 21. The cache controller 17 asserts the RRDY signal valid at time 32 because a check of the tags 160 between times 30 and 31 resulted in a hit on the address A0. At time 32, the data line from the SRAM cache array 16 corresponding to the address A0 is stored in the SRAM array data register 131, and is valid the data bus 19, as indicated by the RRDY signal. Similarly, at times 33, 34, and 35, the data lines from the SRAM cache array 16 corresponding to the addresses A1, A2, and A3 are sequentially stored in the SRAM array data register 131, and sequentially transmitted over the data bus 19.

At time 34, the next CLOCK cycle after the final address A3 of the first read block has stored in the SRAM array address register 130, the second read block transaction begins with the CMDS signal asserted valid by the bus interface unit 28. The second read block corresponding to the addresses B0–B3 proceeds in the same sequence from time 34 through time 39 as the first read block transaction between times 30 and 35.

It will be appreciated that the first and second read block transactions overlap at times 34 and 35. At time 34, the first address B0 of the second read block is transmitted over the address bus 18 without waiting for the first read transaction to complete. At time 35, the second address B1 of the second read block is loaded into the SRAM array address register 130, while the data line corresponding to the final address A3 of the first read block is valid the data bus 19.

Figure 4:
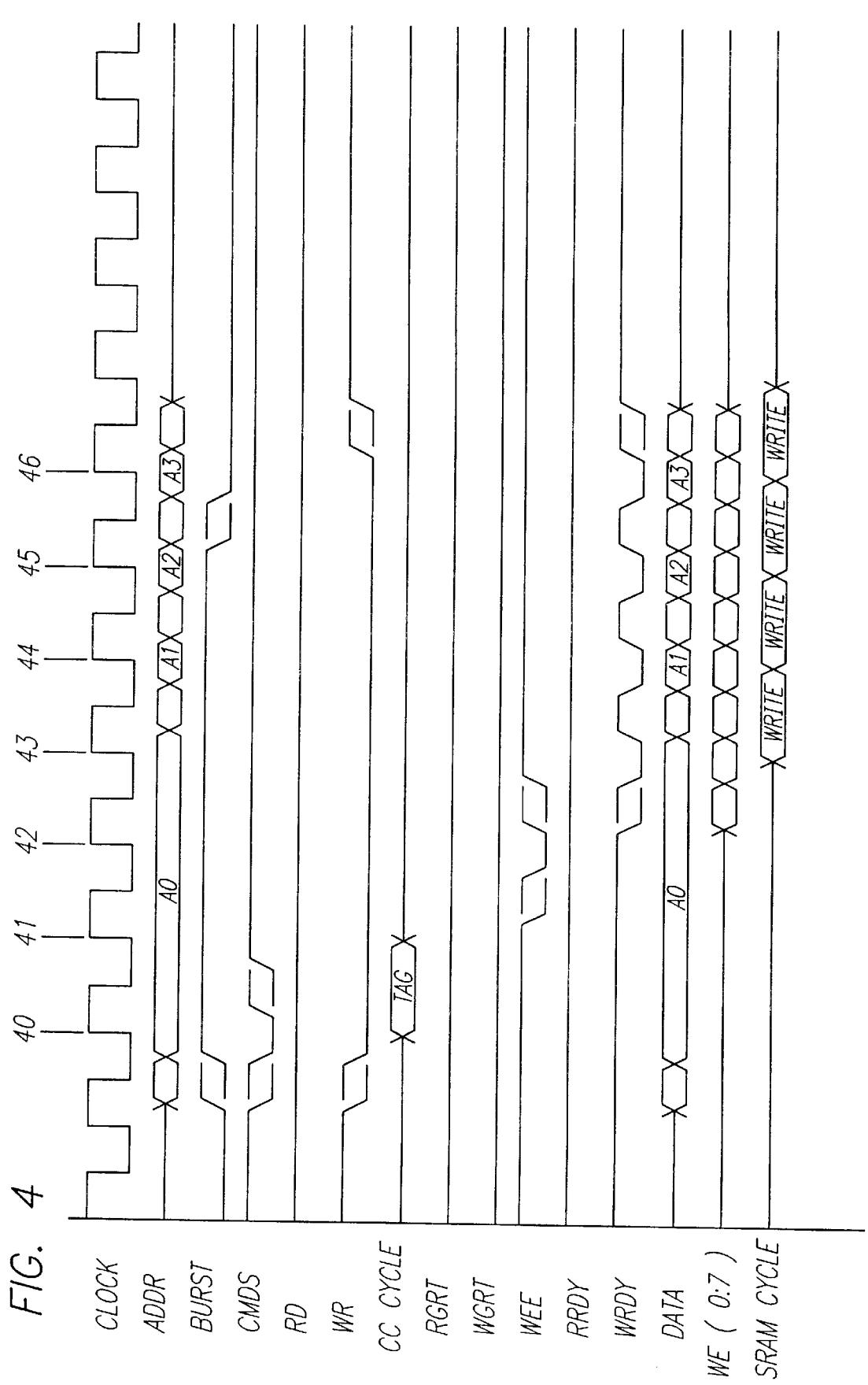
FIG. 4 shows a write block transaction that hits the cache SRAM array cache 16. The write block corresponds to data lines defined by addresses A0–A3.

FIG. 4 shows a write block transaction that hits the cache SRAM array cache 16. The write block corresponds to data lines defined by addresses A0–A3.

At time 40, the CMDS signal from the bus interface unit 28 indicates the start of the write block transaction. The first address A0 of the write block is valid on the address bus 18, as indicated by the ADDR signal at time 40. Also, the data line corresponding to the address A0 is valid on the data bus 19, as indicated by the DATA signal at time 40. The BURST signal indicates that the address A0 is part of a burst transaction, and the WR signal indicates a write transaction. The BURST and WR signals are transmitted by the bus interface unit 28 over the control bus 20. The address A0 is loaded into the cache controller address register 140 on the rising edge of the CLOCK signal. As indicated by the CC cycle signal, the tags 160 of the cache controller 17 are checked for a data line corresponding to the address A0 between times 40 and 41.

At time 42, the WEE signal indicates that a hit on the tags 160 for the address A0 occurred. The WEE signal is transmitted by the cache controller 17 over the control bus 21. At time 43, with the address A0 and the corresponding data line still valid on the address bus 18 and the data bus 19, the WE[0:7] signals are transmitted to the SRAM array cache 16 to enable an SRAM write cycle. The WRDY signal indicates completion of the data line write corresponding to the address A0.

At times 44 through 46, the remaining addresses A1–A3, and their corresponding data lines are transmitted over the address bus 18 and the data bus 19. On each CLOCK cycle, the WE[0:7] signals enable the SRAM array cache 16 write cycles, and WRDY indicates completion of each data line write. The SRAM cycle signal indicates the timing of the SRAM array cache 16 write cycles starting at time 43.

The example above shows a write block transaction which transfers four data lines to the SRAM array cache 16. However, in the current embodiment, a write block transaction can be of arbitrary length. Moreover, the sequence of addresses issued during a write block can be arbitrary within a single 32 byte cache line of the SRAM array cache 16.

Figure 5:
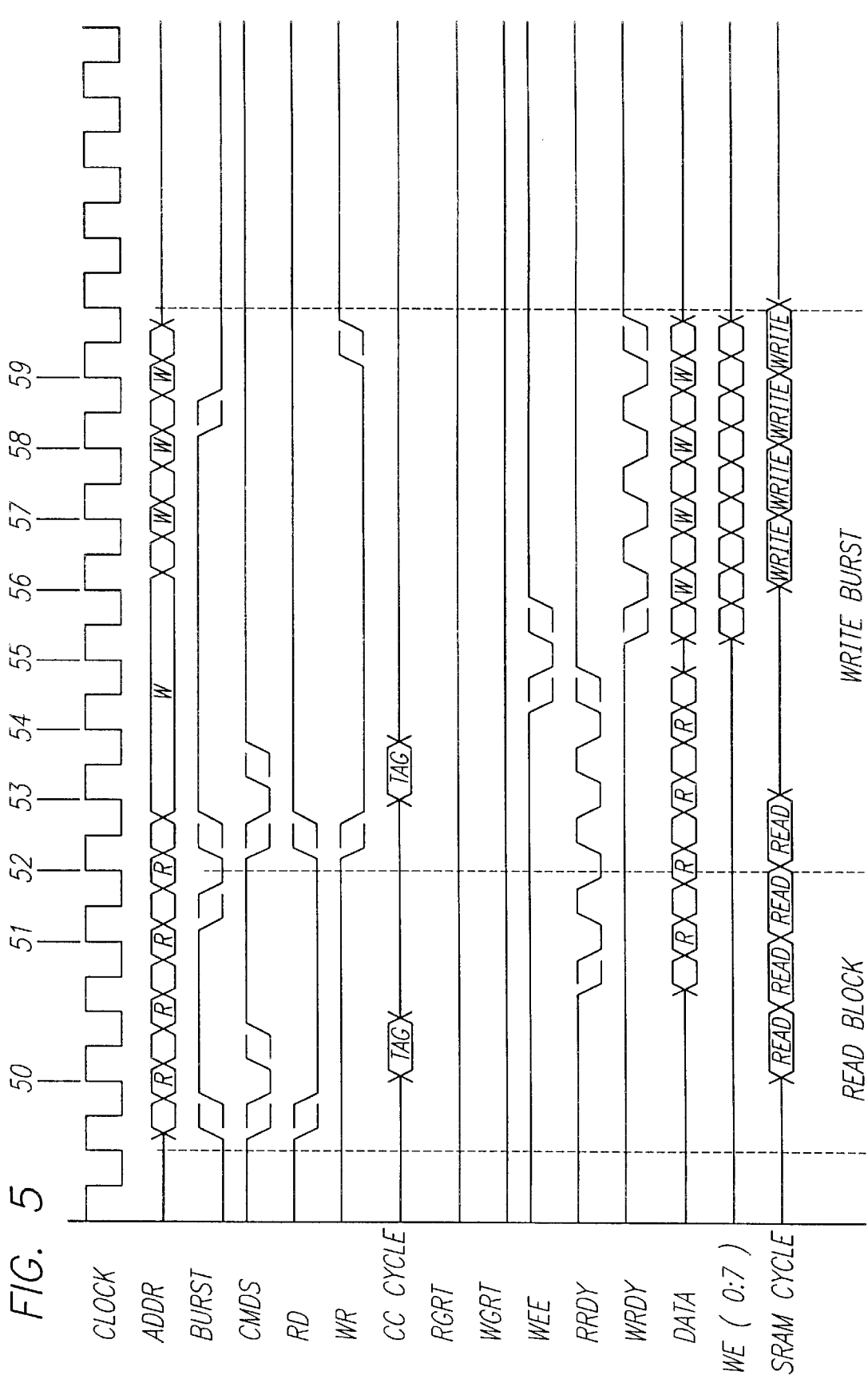
FIG. 5 illustrates overlapping read and write block transactions that both hit the cache SRAM array cache 16. The addresses and data for the read block are indicated by the "r" symbol, and the addresses and data for the write block are indicated by the "w" symbol.

FIG. 5 illustrates a read block transaction that hits the cache SRAM array cache 16, followed by a write block transaction that also hits the cache SRAM array cache 16. The addresses and data for the read block are indicated by the "r" symbol, and the addresses and data for the write block are indicated by the "w" symbol.

The read block transaction begins at time 50, when the CMDS signal indicates the start of a bus transaction. At time 50, the first address of the read block is valid on the address bus 18, as indicated by the ADDR signal. The first address of the read block is loaded into the SRAM array address register 130 and the cache controller address register 140. The CC cycle signal indicates that the tags 160 of the cache controller 17 are checked at time 50. Also at time 50, a read cycle of the SRAM array cache 16 begins, as indicated by the SRAM cycle signal. The RD signal indicates that the address on the address bus 18 is for a read transaction, and the BURST signal from the bus interface unit 28 indicates that the address on the address bus 18 is part of a burst transaction. Between times 50 and 52, a new address of the read block is loaded into the SRAM array address register 130 on the rising edge of the CLOCK signal, as previously discussed for a read block transaction.

At time 51, the RRDY signal from the cache controller 17 indicates to the bus interface unit 28 that the incoming read data on the data bus 19 is valid, and the DATA signals carry the data line corresponding to the first address of the read block. At times 52, 53, and 54, the data lines corresponding to the remaining addresses of the read block are valid on the data bus 19 as indicated by the RRDY signal, in the manner previously discussed.

The write block transaction begins at time 53, when the CMDS signal from the bus interface unit 28 indicates the start of a bus transaction, and when the first address of the write block is valid on the address bus 18 as indicated by the ADDR signal. The BURST signal from the bus interface unit 28 indicates that the address on the address bus 18 is part of a burst transaction, and the WR signal from the bus interface unit 28 indicates a write transaction. At time 53, the first address of the write block is loaded into the cache controller address register 140. As indicated by the CC cycle signal, the tags 160 of the cache controller 17 are checked between times 53 and 54.

At time 55, the WEE signal from the cache controller 17 indicates that a tags 160 hit occured on the first address of the write block, meaning that the corresponding data line is stored in the SRAM array cache 16. At time 56, with the address on the address bus 18 still valid, the new data line is transmitted over the data bus 19 by the bus interface unit 28. Also at time 56, the WE[0:7] signals are transmitted to the SRAM array cache 16 to enable an SRAM write cycle. The WRDY signal indicates completion of the write corresponding to the first address of the write transaction.

At times 57 through 59, the remaining addresses and the corresponding data of the write block are transmitted over the address bus 18 and the data bus 19. On each cycle, the WE[0:7] enables the SRAM array cache 16, and the WRDY signal indicates completion of each data line of the write block. The SRAM cycle signal indicates the timing of the SRAM array cache 16 write cycles starting at time 56.

Figure 6:
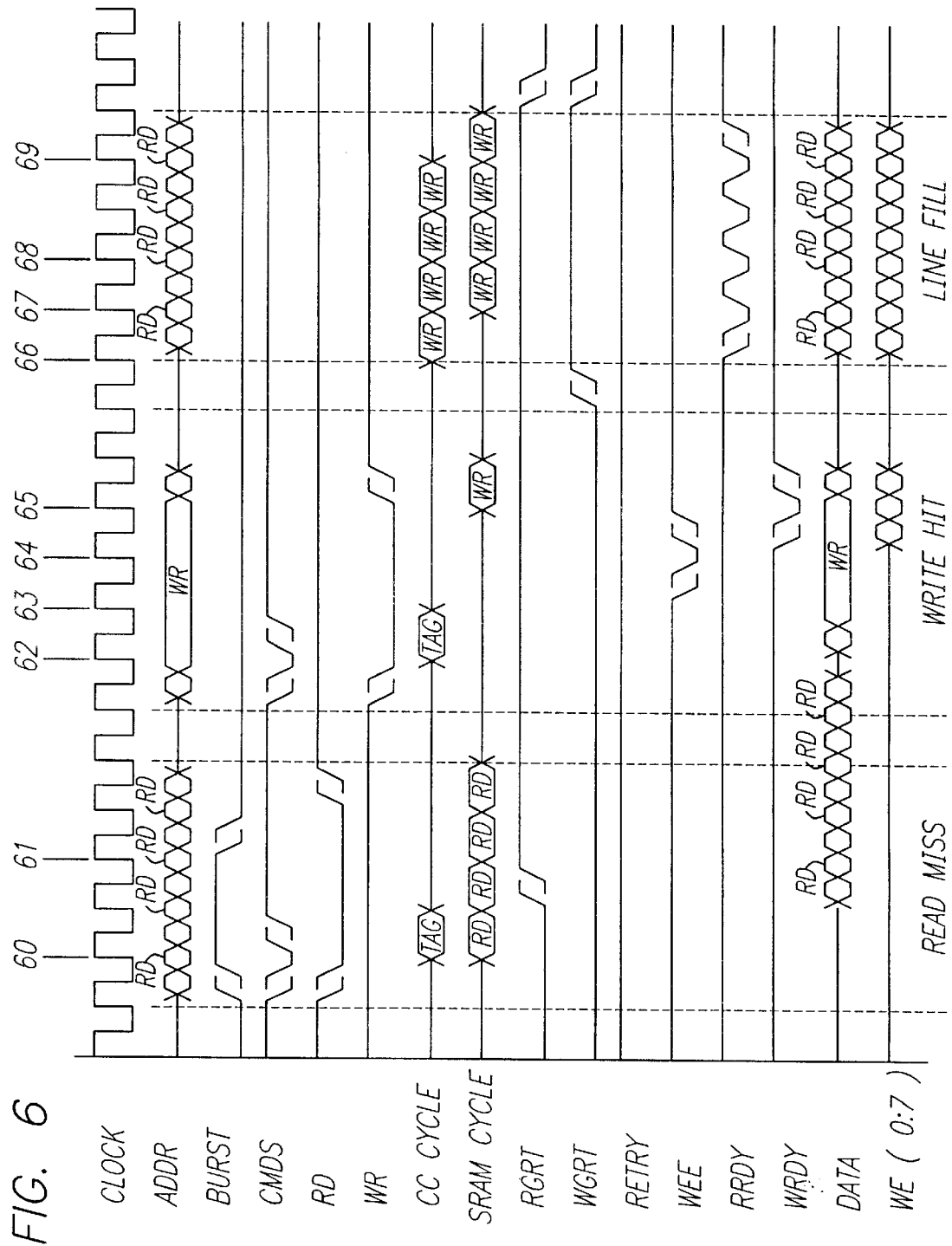
FIG. 6 shows a read block transaction that misses the SRAM array cache 16, with an interleaved write line transaction that hits the SRAM array cache 16. The addresses and data for the read block are indicated by the "rd" symbol, and the address and data for the write block are indicated by the "wr" symbol.

FIG. 6 shows a read block transaction that misses the SRAM array cache 16, with an interleaved write line transaction that hits the SRAM array cache 16. The write line transaction is interleaved because it occurs during an external fetch of the missed read block. The addresses and data for the read block are indicated by the "rd" symbol, and the address and data for the write block are indicated by the "wr" symbol.

The read block transaction begins normally at time 60, with the CMDS signal indicating the start of a bus transaction. At time 60, the first address of the read block is valid on the address bus 18, as indicated by the ADDR signal. Also at time 60, the first address of the read block is loaded into the SRAM array address register 130 and the cache controller address register 140. As indicated by the CC cycle signal, the tags 160 of the cache controller 17 are checked beginning at time 60. A read cycle of the SRAM array cache 16 begins at time 60, as indicated by the SRAM cycle signal. As before, the RD signal indicates that the address on the address bus 18 is for a read transaction, and the BURST signal indicates a burst transaction. Starting a time 60, an address in the read block is loaded into the SRAM array address register 130 on the rising edge of the CLOCK signal, as previously discussed for a read block transaction.

Starting at time 61, data lines corresponding to the addresses loaded into the SRAM array address register 130 are transferred out of the SRAM array data register 131. However, at time 61 the RGRT signal from the cache controller 17 is inactive, which indicates that the first address of the read block missed the SRAM array cache 16. The RGRT signal is transmitted by the cache controller 17 over the control bus 21.

While the cache controller 17 externally fetches the missed read block, the bus interface unit initiates an interleaved write line transaction. The interleaved write line transaction begins at time 62, when the CMDS signal from the bus interface unit 28 indicates the start of a bus transaction. Also at time 62, the address of the write line is valid on the address bus 18, and is loaded into the cache controller address register 140. The BURST signal is inactive indicating that the address on the address bus 18 is not part of a burst transaction, and the WR signal indicates a write transaction. The CC cycle signal indicates that the tags 160 of the cache controller 17 are checked between times 62 and 63.

At time 64, the WEE signal from the cache controller 17 indicates that a tags 160 hit occured on the address of the write block. At time 65, with the address on the address bus 18 still valid, and the corresponding data line valid on the data bus 19, the WE[0:7] signals are transmitted to the SRAM array cache 16 to enable an SRAM write cycle. The WRDY signal indicates completion of the write line.

At time 66, the WGRT and RGRT signals from the cache controller 17 are inactive, indicating that further bus transaction is not allowed because the missed read block is being received. At time 66, the first address of the missed read block is processed into the tags 160 of the cache controller 17, as indicated by the CC cycle signal. At time 67, the first address of the missed read block is again valid on the address bus 18, and the corresponding data from is valid on the data bus 19. The RRDY signal indicates the bus interface unit 28 that valid data is available, and the WE[0:7] signals are transmitted to the SRAM array cache 16 to store the first data line of the missed read block. Thus, the missed data line is supplied to the SRAM array cache 16 and the bus interface unit 28 at the same time.

In a similar sequence, the remaining three data lines of the missed read block are transferred to the bus interface unit 28 and the SRAM array cache 16, starting at time 68 through time 69. The the SRAM cycles show the write cycles of the SRAM array cache 16 to store the incoming missed data lines. The CC cycle shows the updating of the tags 160 of the cache controller 17.

Figure 7:
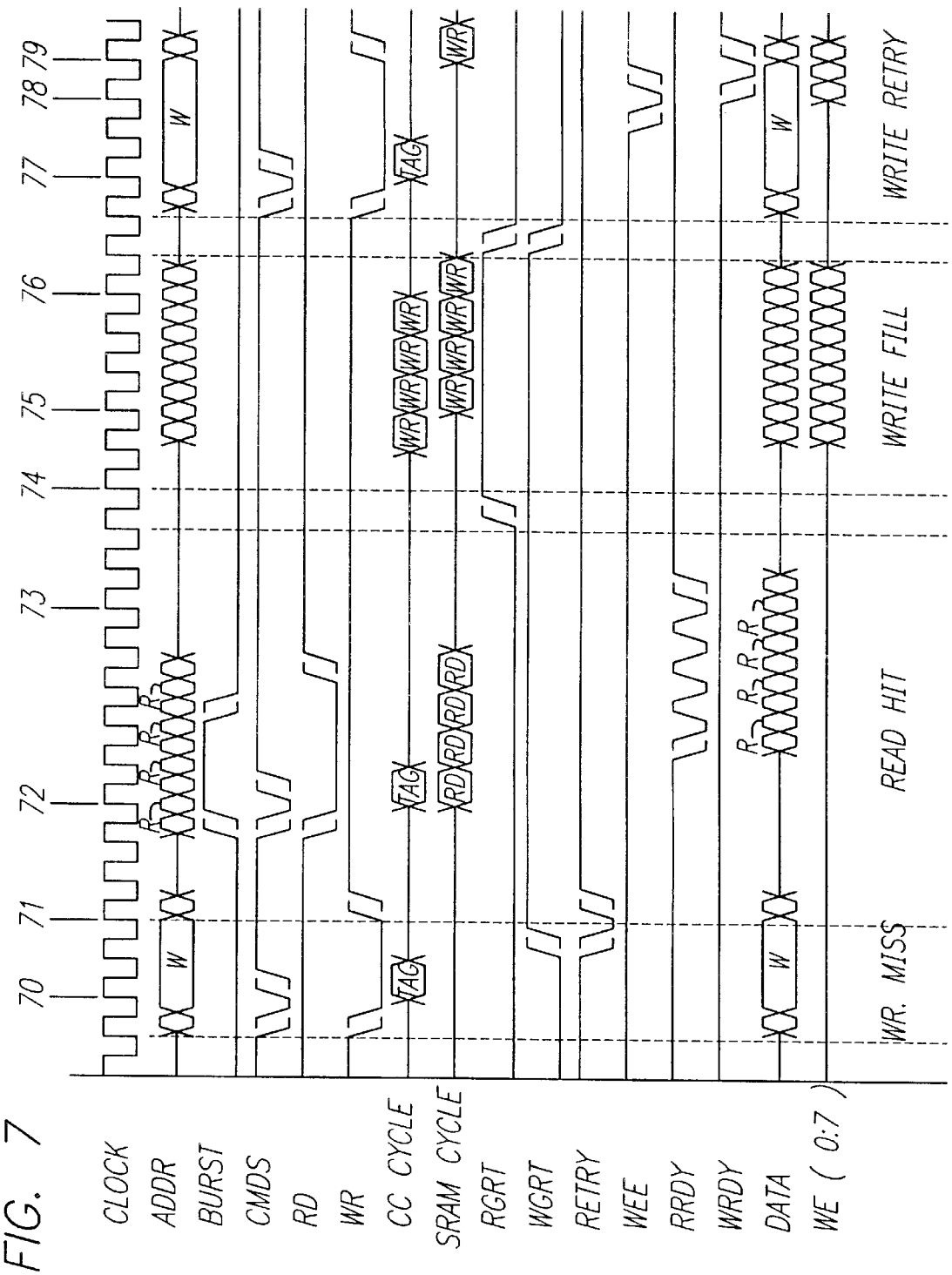
FIG. 7 illustrates a write line transaction that misses the SRAM array cache 16, with an interleaved read block transaction that hits the SRAM array cache 16. The address and data for the write line are indicated by the "w" symbol, and the addresses and data for the read block are indicated by the "r" symbol.

FIG. 7 illustrates a write line transaction that misses the SRAM array cache 16, with an interleaved read block transaction that hits the SRAM array cache 16. After the interleaved read block, a write block containing the missed write line is received, and the write line transaction is retried. The read block transaction is interleaved because it occurs during an external fetch of the missed write line. The address and data for the write line are indicated by the "w" symbol, and the addresses and data for the read block are indicated by the "r" symbol.

The write line transaction begins at time 70, when the CMDS signal from the bus interface unit 28 indicates the start of a bus transaction, and the address of the write line is valid on the address bus 18 as indicated by the ADDR signal. The address of the write line is loaded into the cache controller address register 140. The BURST signal from the bus interface unit 28 is inactive indicating that the address on the address bus 18 is not part of a burst transaction, and the WR signal from the bus interface unit 28 indicates a write transaction. Beginning at time 70, the tags 160 of the cache controller 17 are checked, and the write data line from the bus interface unit 28 is valid on the data bus 19.

However, at time 71, the WGRT signal is inactive, which indicates that a tags 160 miss occured, and the desired data line is not stored in the SRAM array cache 16. Thereafter, the cache controller 17 externally fetches a missed write block corresponding to the write line.

Meanwhile, the bus interface unit 28 starts a read block transaction at time 72 by activating the CMDS signal to indicate the start of a bus transaction. At time 72, the first address of the read block is valid on the address bus 18 as indicated by the ADDR signal, and is loaded into the SRAM array address register 130 and the cache controller address register 140. As indicated by the CC cycle signal, the tags of the cache controller 17 are checked at time 72. A read cycle of the SRAM array cache 16 occurs as indicated by the SRAM cycle signal. The RD signal indicates a read transaction, and the BURST signal indicates a burst transaction. The read block transaction proceeds between times 72 and 73 in the manner previously discussed.

At time 74, the WGRT and RGRT signals from the cache controller 17 are inactive. This indicates to the bus interface unit 28 that a bus transaction is not allowed because the missed write block is being received. At time 75, the first address of the missed write block is loaded into the SRAM array address register 130, and the externally received data line is valid on the data bus 19. The WE[0:7] signals are transmitted to the SRAM array cache 16 to store the missed data line.

In a similar sequence, the remaining three missed data lines are transferred to the SRAM array cache 16, up through time 76. The CC cycle shows updating of the tags of the cache controller 17, while the SRAM cycles shows write cycles of the SRAM array cache 16.

A write line retry transaction begins at time 77, when the CMDS signal from the bus interface unit 28 indicates the start of a bus transaction, and the address of the write line is valid on the address bus 18. The address of the write line is stored in the cache controller address register 140. The BURST signal is inactive, and the WR signal indicates a write transaction. As indicated by the CC cycle signal, the tags 160 of the cache controller 17 are checked at time 77.

At time 78, the WEE signal from the cache controller 17 indicates a hit on the tags 160 of the cache controller 17. At time 79, the WE[0:7] signals are transmitted to the SRAM array cache 16 to store the data line. The WRDY signal indicates completion of the write line retry.

Figure 8:
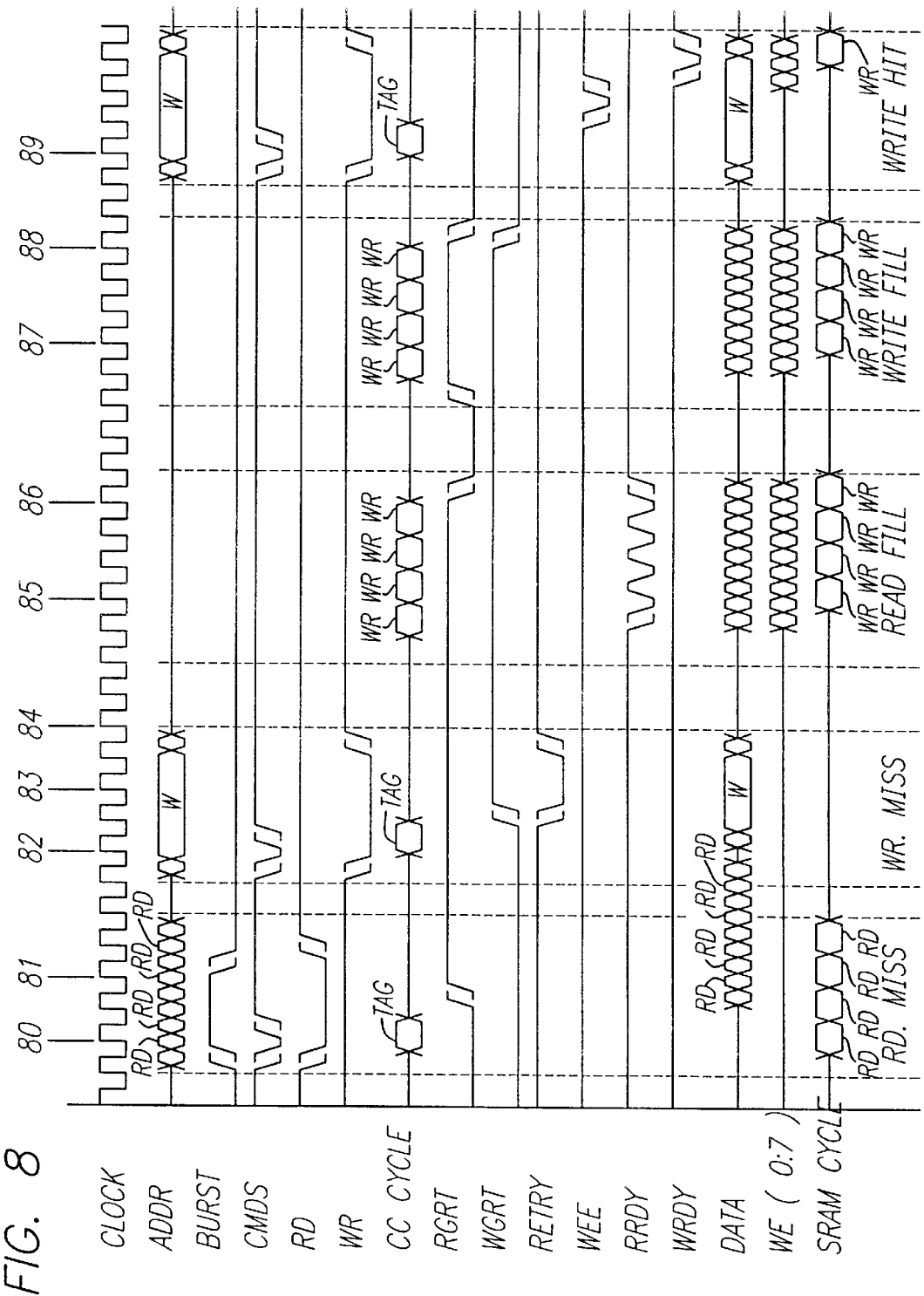
FIG. 8 shows a read block transaction that misses the SRAM array cache 16, followed by an interleaved write line transaction that also misses. The addresses and data for the read block are indicated by the "r" symbol, and the address and data for the write line are indicated by the "w" symbol.

FIG. 8 shows a read block transaction that misses the SRAM array cache 16, followed by an interleaved write line transaction that also misses. Thereafter, a read fill transaction occurs for the missed read block, then a write fill transaction occurs for a write block containing the missed write line. Finally, a write line retry occurs for the missed write line. The addresses and data for the read block are indicated by the "r" symbol, and the address and data for the write line are indicated by the "w" symbol.

The attempted read block transaction begins at time 80, with the CMDS signal indicating the start of a bus transaction. At time 80, the first address of the read block is valid on the address bus 18 as indicated by the ADDR signal. Also at time 80, the first address is loaded into the SRAM array address register 130 and the cache controller address register 140, and the tags 160 of the cache controller 17 are checked. A read cycle of the SRAM array cache 16 occurs, as indicated by the SRAM cycle signal, the RD signal indicates a read transaction, and the BURST signal indicates a burst transaction. Beginning a time 80, successive read block addresses are loaded into the SRAM array address register 130 on each rising edge of the CLOCK signal, as previously discussed for a read block transaction.

Starting at time 81, successive data lines corresponding to the read block addresses are transferred out of the SRAM array data register 131. However, at time 81 the RGRT signal from the cache controller 17 is inactive, which indicates that the first address of the read block missed the tags 160 of the cache controller 17.

While the missed read block is externally fetched by the cache controller 17, the write line transaction begins at time 82, when the CMDS signal from the bus interface unit 28 indicates the start of a bus transaction. The address of the write line is valid on the address bus 18 as indicated by the ADDR signal, and is loaded into the cache controller address register 140. The BURST signal from the bus interface unit 28 is inactive, and the WR signal from the bus interface unit 28 indicates a write transaction. Beginning at time 82, the tags 160 of the cache controller 17 are checked.

At time 83, the WGRT signal is inactive, which indicates that the desired data line missed the tags 160 of the cache controller 17. Thereafter, a write block containing the desired data line is fetched externally by the cache controller 17.

At time 84, the WGRT and RGRT from the cache controller 17 signals are inactive, which indicates that a bus transaction is not allowed because the missed read block is being received. At time 85, the first data line of the missed read block is valid on the data bus 19, the RRDY signal is active indicating to the bus interface unit 28 that valid data is available, and the WE[0:7] signals are transmitted to the SRAM array cache 16 to store the data line.

In a similar manner, the remaining three data lines of the missed read block are transferred to the bus interface unit 28 and the SRAM array cache 16, up through time 86. The CC cycle shows when the tags 160 of the cache controller 17 are updated, and the SRAM cycles indicates write cycles of the SRAM array cache 16 to store the incoming data lines.

Between times 86 and 87, the WGRT and RGRT signals are again inactive, indicating to the bus interface unit 28 that a bus transaction is not allowed because the missed write block is being received. At time 87, the first line of the missed write block is valid on the data bus 19, and the WE[0:7] signals are transmitted to the SRAM array cache 16 to store the missed line.

The remaining three lines of the missed write block are transferred to the SRAM array cache 16 up through time 88. The CC cycle shows updating of the tags 160 of the cache controller 17, while the SRAM cycles shows write cycles of the SRAM array cache 16 to store the incoming data lines.

A write line retry transaction begins at time 89, when the CMDS signal from the bus interface unit 28 indicates the start of a bus transaction, and the address of the write line is valid on the address bus 18, as indicated by the ADDR signal. The address is loaded into the cache controller address register 140. The BURST signal is inactive, and the WR signal indicates a write transaction. As indicated by the CC cycle signal, the tags 160 of the cache controller 17 are checked at time 89. Also at time 89, the data for the write line is valid on the data bus 19.

Thereafter, the WEE signal from the cache controller 17 indicates a hit on the tags 160. The WE[0:7] signals are transmitted to the SRAM array cache 16 to store the write data line, and the WRDY signal indicates completion of the write line retry.

Figure 9:
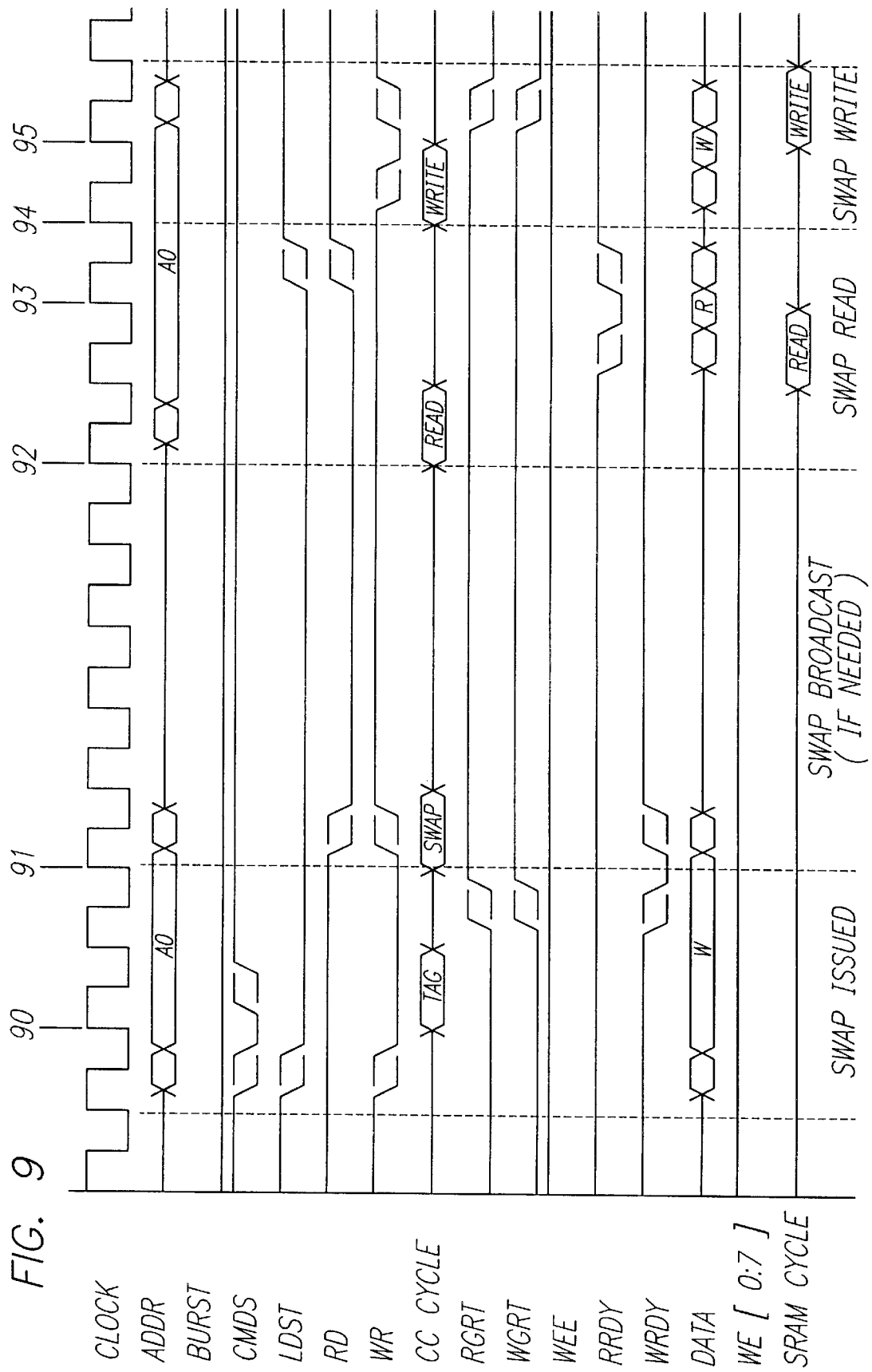
FIG. 9 shows a swap transaction, which exchanges the contents of an internal register of the CPU 15 with a memory location. The write data and read data for the swap transaction are indicated by the "w" and "r" symbols, respectively.

FIG. 9 shows a swap transaction, which exchanges the contents of an internal register of the CPU 15 with a memory location. The swap transaction begins at time 90 when the bus interface unit 28 transmits the CMDS signal, the swap address A0, the corresponding data line w, and the LDST signal that indicates a swap transaction. Thereafter, the cache controller 17 buffers the data line w. Between times 91 and 92, the swap write is broadcast to other CPU's if the data line is shared. Beginning at time 92, the cache controller 17 reads the data line externally, and transmits the data line to the CPU 15. Beginning at time 94, the cache controller 17 writes the buffered data line w into the SRAM array cache 16.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A computer system, comprising:
   a processor that performs overlapping burst memory accesses to a cache memory by transferring a series of memory addresses over a bus and that performs an interleaved memory access to the cache memory if one of the series of memory addresses causes a cache miss to the cache memory;
   a cache controller that accesses the cache memory according to the series of memory addresses and that accesses the cache memory according to the interleaved memory access while fetching a data line for the memory address that causes the cache miss from an external memory.

2. The computer system of claim 1, wherein a burst memory access is a burst read and the interleaved memory access is a write to the cache memory.

3. The computer system of claim 2, wherein the cache controller includes circuitry for storing the data line for the memory address that causes the cache miss into the cache memory, and for completing the burst read after completing the write to the cache memory before any further cache accesses are completed.

4. The computer system of claim 1, wherein a burst memory access is a burst write and the interleaved memory access is a read from the cache memory.

5. The computer system of claim 4, wherein the cache controller includes circuitry for reinitiating and completing the burst write to the cache memory after completing the read from the cache memory, before any further cache accesses are completed.

6. A computer system for performing an overlapping burst data transfer and an interleaved memory write after a cache miss, the computer system comprising:

a plurality of buses including a data bus, an address bus and a control bus;

a processor coupled to the plurality of buses, the processor including a bus interface unit;

a physical memory coupled to the plurality of buses;

a cache memory; and a cache control unit coupled to the cache memory and the plurality of buses so as to allow overlapping burst data transfers between the processor and the cache memory, the cache control unit placing a read miss signal on the control bus, initiating a read from the physical memory in response to a cache read miss during a burst read, overlapping the read from the physical memory with one other burst data transfer, and performing a cache tag check in response to a write request from the bus interface unit, the write request being in response to the read miss signal.

7. The computer system of claim 6 wherein the cache tag check results in a cache write hit, the cache control unit updating the cache memory in response to the write request and placing a signal on the control bus to suspend further read and write requests while the read from physical memory results in placing on the data bus a read block, the read block being received by the cache memory and the bus interface unit.

8. The computer system of claim 6 wherein the cache tag check results in a cache write miss, the cache control unit filling the cache memory in response to the burst read miss and placing a signal on the control bus to suspend further read and write requests while filling the cache memory in response to the cache write miss.

9. A computer system for performing an overlapping burst data transfer and an interleaved memory read after a cache miss, the computer system comprising:

a plurality of buses including a data bus, an address bus and a control bus;

a processor coupled to the plurality of buses, the processor including a bus interface unit;

a physical memory coupled to the plurality of buses;

a cache memory; and a cache control unit coupled to the cache memory and the plurality of buses so as to allow overlapping burst data transfers between the processor and the cache memory, the cache control unit placing a write miss signal on the control bus, initiating a write to the physical memory in response to a cache write miss, completing a burst read after a cache read hit in response to a burst read request from the bus interface unit, and sending a signal on the control bus to suspend further read and write requests while the cache memory is filled with write miss data.

10. In a computer system having a processor, a bus interface unit, physical memory, a cache control unit coupled to a cache memory and the bus interface unit through a data bus and a control bus, a method for performing an overlapping burst memory transfer and an interleaved memory write after a cache miss, the method comprising the steps of:

placing a read miss signal on the control bus by the cache control unit in response to a cache read miss during a burst read;

initiating a read from physical memory in response to the cache read miss;

sending an interleaved write request to the cache control unit by the bus interface unit in response to the read miss signal;

overlapping burst memory transfers which result from the write request with other burst memory transfers; and performing a cache tag check for the interleaved write request.

11. The method of claim 10 further comprising the steps of:

obtaining a cache hit for the interleaved write request and thereby updating the cache memory;

placing a signal on the control bus to suspend further read and write requests while the read from physical memory results in placing on the data bus a read block; and receiving the read block by the cache memory and the bus interface unit.

12. The method of claim 10 further comprising the steps of:

obtaining a cache miss for the interleaved write request; and filling the cache memory for the burst read miss; and placing a signal on the control bus to suspend further read and write requests while filling the cache memory for the interleaved write request.

13. In a computer system having a processor, a bus interface unit, physical memory, a cache control unit coupled to a cache memory and the bus interface unit through a data bus and a control bus, a method for performing an overlapping burst memory transfer and an interleaved memory read after a cache miss, the method comprising the steps of:

placing a write miss signal on the control bus by the cache control unit in response to a cache write miss;

initiating a write to physical memory by the cache control unit in response to the cache write miss;

sending an interleaved burst read request by the bus interface unit to the cache control unit in response to the write miss signal;

completing the interleaved burst read by the cache control unit after obtaining a cache read hit;

overlapping burst data transfers which result from the burst read with other burst data transfers; and placing a signal on the control bus by the cache control unit to suspend further read and write requests while filling the cache memory for the write request.

14. An apparatus for transferring data between a processor, a cache memory, and physical memory over a bus, the apparatus comprising:

means for placing a read miss signal on the bus and initiating a read from physical memory in response to a cache read miss during a burst memory read;

means for requesting an interleaved memory write request in response to the cache read miss;

means for overlapping burst data transfers that may occur due to the memory write request; and means for determining a cache hit or miss for the interleaved memory write request.

15. The apparatus of claim 14 further comprising:

means for updating the cache memory in response to a cache hit for the interleaved memory write request; and means for suspending further read and write requests while placing read data from physical memory on the bus.

16. The apparatus of claim 14 further comprising:

means for filling the cache memory according to the cache read miss in response to a cache miss for the interleaved memory write request; and means for suspending further read and write requests while filling cache memory according to the interleaved memory write request.

17. An apparatus for transferring data between a processor, a cache memory, and physical memory over a bus, the apparatus comprising:

means for placing a write miss signal on the bus and initiating a write to physical memory in response to a cache write miss during a burst memory write;

means for overlapping the write to physical memory with other burst data transfers that may occur;

means for requesting an interleaved burst read request in response to the cache write miss;

means for processing the interleaved burst read request in response to a cache read hit; and means for suspending further read and write requests while filling cache memory according to the cache write miss.

* * * * *